(12) United States Patent
Uracz et al.

(10) Patent No.: US 8,220,362 B2
(45) Date of Patent: Jul. 17, 2012

(54) CAM APPARATUS FOR VALVE STEM ACTUATION

(75) Inventors: Tomasz Uracz, Everett (CA); Abdeslam Bouti, Swanton, VT (US); Andre Axel Kromberg, Newmarket (CA); Thomas Andrew Lawrence, Burlington, VT (US); Stephen Linwood Gray, Cambridge, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 1134 days.

(21) Appl. No.: 11/877,101

(22) Filed: Oct. 23, 2007

(65) Prior Publication Data

US 2009/0100962 A1  Apr. 23, 2009

(51) Int. Cl.
| | |
|---|---|
| *F16H 53/00* | (2006.01) |
| *F16H 53/06* | (2006.01) |
| *A23P 1/00* | (2006.01) |
| *B29B 11/06* | (2006.01) |
| *B29C 35/00* | (2006.01) |

(52) U.S. Cl. ............ 74/567; 74/569; 425/564; 425/566; 425/570; 251/250

(58) Field of Classification Search ............ 74/567–569; 425/564, 566, 570; 251/250
See application file for complete search history.

(56) References Cited

U.S. PATENT DOCUMENTS

| | | | | |
|---|---|---|---|---|
| 3,454,991 | A * | 7/1969 | Rees | 425/169 |
| 4,023,393 | A | 5/1977 | Messerschmidt | |
| 4,160,409 | A | 7/1979 | Portmann | |
| 4,276,823 | A | 7/1981 | Rotzler | |
| 4,330,258 | A * | 5/1982 | Gellert | 425/564 |
| 4,497,621 | A | 2/1985 | Kudert et al. | |
| 4,630,516 | A | 12/1986 | Koch et al. | |
| 5,713,237 | A | 2/1998 | Bruns | |
| 6,113,381 | A | 9/2000 | Gellert et al. | |
| 6,347,933 | B1 | 2/2002 | Pscherer | |
| 7,210,922 | B1 | 5/2007 | Kohler | |
| 7,815,431 | B2 * | 10/2010 | Gunther | 425/564 |
| 2008/0160125 | A1 * | 7/2008 | Fairy | 425/145 |

OTHER PUBLICATIONS

Search Report 4 pages.

* cited by examiner

*Primary Examiner* — Vinh T. Luong (57) ABSTRACT

A cam and cam follower apparatus translates linear cam bar movement to perpendicular valve stem actuation in an injection molding system. The cam bars reciprocate up and down on linear bearing rails such that an actuation plate, fitted with a plurality of valve stems, is cycled normal to the direction of the cam bar movement via cam followers traveling within cam slots in the cam bars. The cam slots in the cam bars are profiled such that the cam followers affect the speed and force at which the valve stems travel while at the same time reducing frictional effects and their associated power requirement. The cam followers of the valve stem actuation plate travel in cam slots in the cam bars from a valve stem forward position, to a valve stem retracted position and ultimately, the entire actuation plate may be removed from the cam bars for maintenance via open ended slots in the cam bars.

19 Claims, 9 Drawing Sheets

CAM APPARATUS FOR VALVE STEM ACTUATION

TECHNICAL FIELD OF THE INVENTION

The present invention relates to, but is not limited to, injection molding systems, and more specifically the invention relates to a cam apparatus whereby the cam followers of a valve stem actuation plate are guided in cam slots within a plurality of cam bars which have an egress for the actuation plate for maintenance thereon.

BACKGROUND

Mechanical shut-off, or closure, of an injection molding gate orifice is commonly achieved using a valve stem, or pin, which is actuated via pneumatic, hydraulic or electromechanical means. The actuator may be positioned congruent with the valve stem movement or adjacent to the valve stems and connected by means of a lever mechanism, or additionally, perpendicular to the valve stem movement utilizing a wedge device.

When the actuator movement is positioned perpendicular to the valve stem movement, the force required to move the valve stem is dependent on the friction between the mating components. If using an electromechanical actuator, this frictional load will result in an additional torque requirement and higher power consumption, necessitating a larger electric motor, than if an alternative arrangement were implemented. The additional friction will also result in increased wear between components, resulting in loss of positional accuracy or in their premature failure.

A plurality of valve stems are often mounted together on a single actuation plate for simplicity of design and minimization of redundant components. Additionally, reduced pitch spacing between valve stems can be realized without individual piston actuators for each valve stem requiring proximate installations. However, in this case, disassembly for service or maintenance becomes difficult. To replace a single valve stem it will be required to remove the entire actuation plate assembly from the mold. Mold disassembly can be somewhat labor intensive, while separation of the hot runner from the mold is usually less complicated. Therefore, it is more desirable for the actuation plate and valve stems to remain with the hot runner, and then subsequently be easily removed from the hot runner as one unit.

Additionally, it is crucial that the timing, or relative position, of the valve stems be maintained throughout the entire maintenance procedure with respect to the cam slots and the cam followers of the actuation plate which travel therein. Valve stems are aligned with their respective gate orifices to within microns to ensure accurate, non-destructive engagement and any mis-adjustment due to the removal and insertion of the actuation plate process would be catastrophic to the mold. For this reason, proper alignment must be ensured throughout the entire maintenance procedure.

Because injection forces are so high, the precision of any cam follower and cam arrangement in a hot runner system is in jeopardy of being damaged due to mechanical stresses being conveyed to these components unintentionally. Any slight variation in cam follower tangency to a cam slot will affect not only the balance of the entire actuation plate assembly, but the ultimate valve stem position, which will result in premature wear of the cam followers, cams and any upstream linkages, as well as misalignment of the valve stems with the gate orifices, which will cause costly damage to both components.

U.S. Pat. No. 6,113,381 describes the use of inclined planes to translate linear actuator movement to perpendicular valve stem movement via electromechanically actuated slide blocks in diagonal grooves. These bearing surfaces must be flat and parallel and in addition to having multiple frictional contact surfaces susceptible to high wear, their requirement for a close, mating fit results in a limited ability to adjust the profile of motion of the valve stems. Additionally, the range of motion of the block-in-groove design results in a flat velocity profile precluding any variation in speed or force of valve stem travel.

While U.S. Pat. No. 7,210,922 B1 describes a valve pin activation plate, whereby a plurality of valve stems are positioned together on one plate and are simultaneously reciprocated via some method, the details of this aspect of the invention are not described nor claimed in that document.

For the foregoing reasons, the present invention is directed to overcoming one or more of the problems or disadvantages set forth above, and for providing a cam apparatus whereby a valve stem actuation plate is guided on cam followers in profiled cam slots, and which also has a method of removing the entire actuation plate from the hot runner for ease of maintenance.

SUMMARY

The present invention is directed to an apparatus utilizing a cam and cam follower design to translate linear cam bar movement to perpendicular valve stem actuation in an injection molding system. The cam bars reciprocate up and down on linear bearing rails such that very low friction cam followers, such as rollers or the like, attached to an actuation plate fitted with a plurality of valve stems, are cycled normal to the direction of the cam bar movement. Cam slots in the cam bars are profiled such that they may cause the cam followers traveling therein to affect the speed and force at which the valve stems travel while at the same time reducing frictional effects and their associated power requirement.

In one aspect of the present invention, the profile of the cam slot has a first position at which the cam followers, attached to the actuation plate, cause the valve stems to be in a gate closed position.

In another aspect of the present invention, the profile of the cam slot has a second position at which the cam followers, attached to the actuation plate, cause the valve stems to be in a gate open position.

In yet another aspect of the present invention, the profile of the cam slot has a third position at which the cam followers, attached to the actuation plate, are disengaged from the second position and poised in an exit slot for imminent removal.

In a further aspect of the present invention, in anticipation of removal of the actuation plate and valve stems for servicing, a locking pin is inserted through the frame of the hot runner and into the cam bars to ensure the exact position of the valve stems is maintained upon re-installation of the actuation plate, to ensure accuracy of alignment of each valve stem to gate orifice. The cam followers, and hence the actuation plate, can then be removed through the exit slots from the cam bars which have openings on their clamp face. The actuation plate and valve stems are now free of the hot runner for ease of maintenance.

In another aspect of the present invention, a plurality of mechanical stops are attached to either the actuation plate or to the backing plate, to limit the amount of travel by the actuation plate in certain phases of travel to ensure its precise location is achieved and to prevent excessive injection force from being transferred to the cam followers.

The present invention provides the ability to simultaneously translate a plurality of valve stems through a multiplicity of positions, which include a gate open, gate closed, and service position, via the precise travel of cam followers, attached to an actuation plate, in profiled cam slots in a cam apparatus.

These and other features, aspects, and advantages of the present invention will become better understood with regard to the following description, appended claims and accompanying drawings.

DETAILED DESCRIPTION

Figure 1:
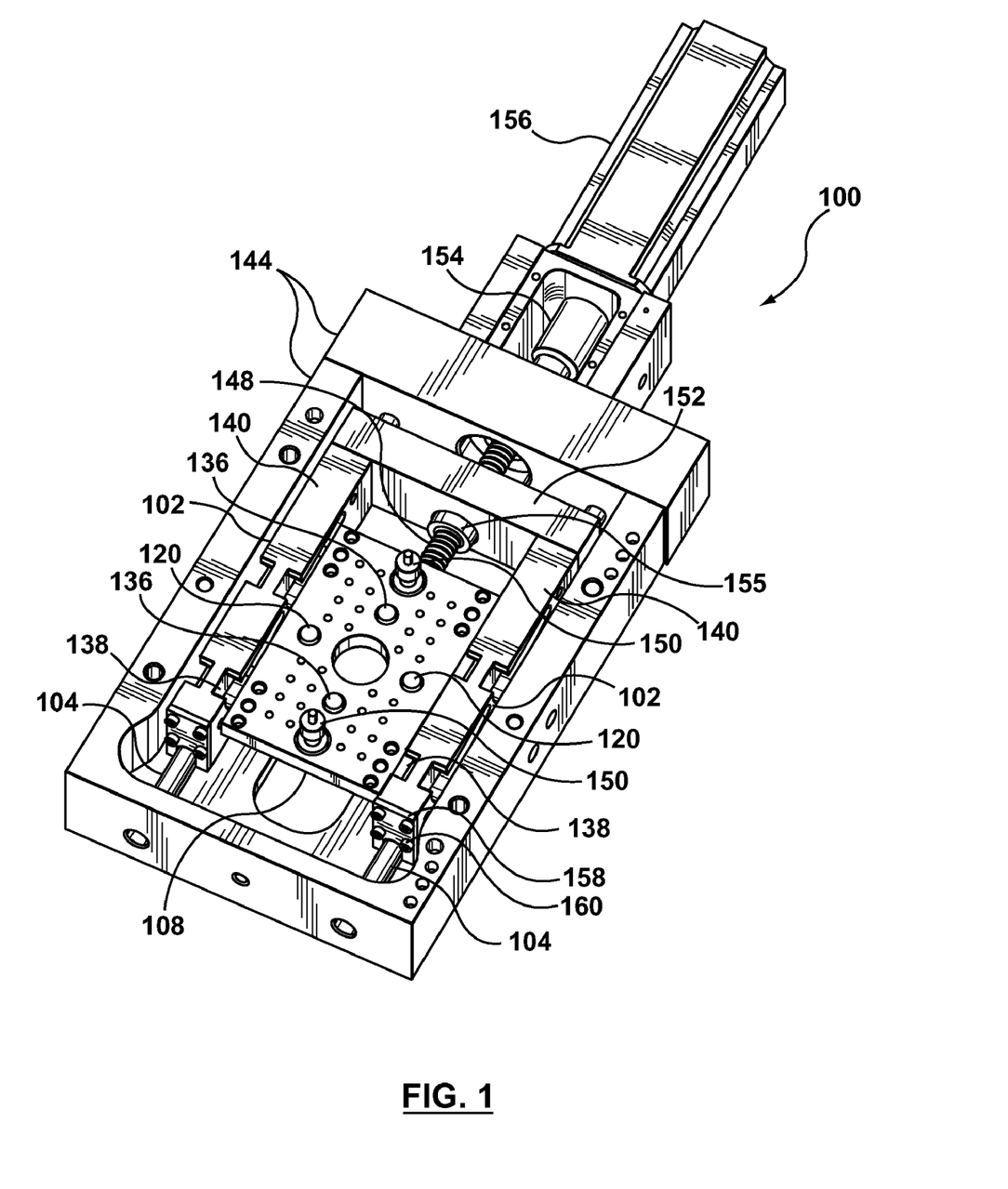
FIG. 1 is an isometric assembly view of the cam apparatus including the drive mechanism.

Referring to the drawings, and initially to FIG. 1, a cam apparatus 100 of a hot runner injection molding system, in accordance to the present invention, is shown. The components shown are not a complete representation of the entire hot runner but are rather those necessary to understand and practice the present invention.

Figure 2:
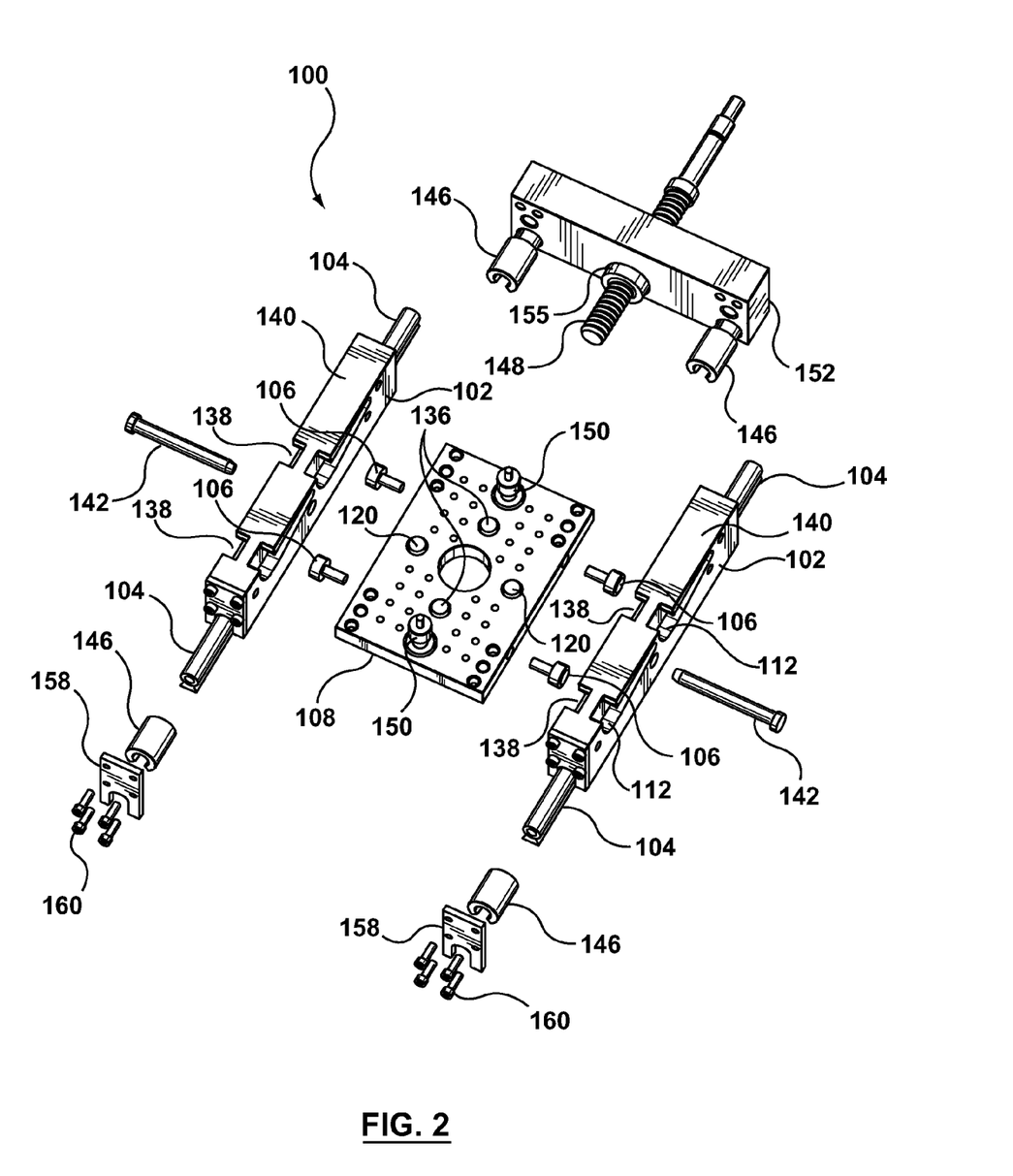
FIG. 2 is an exploded isometric view isolating the cam assembly.
Figure 3:
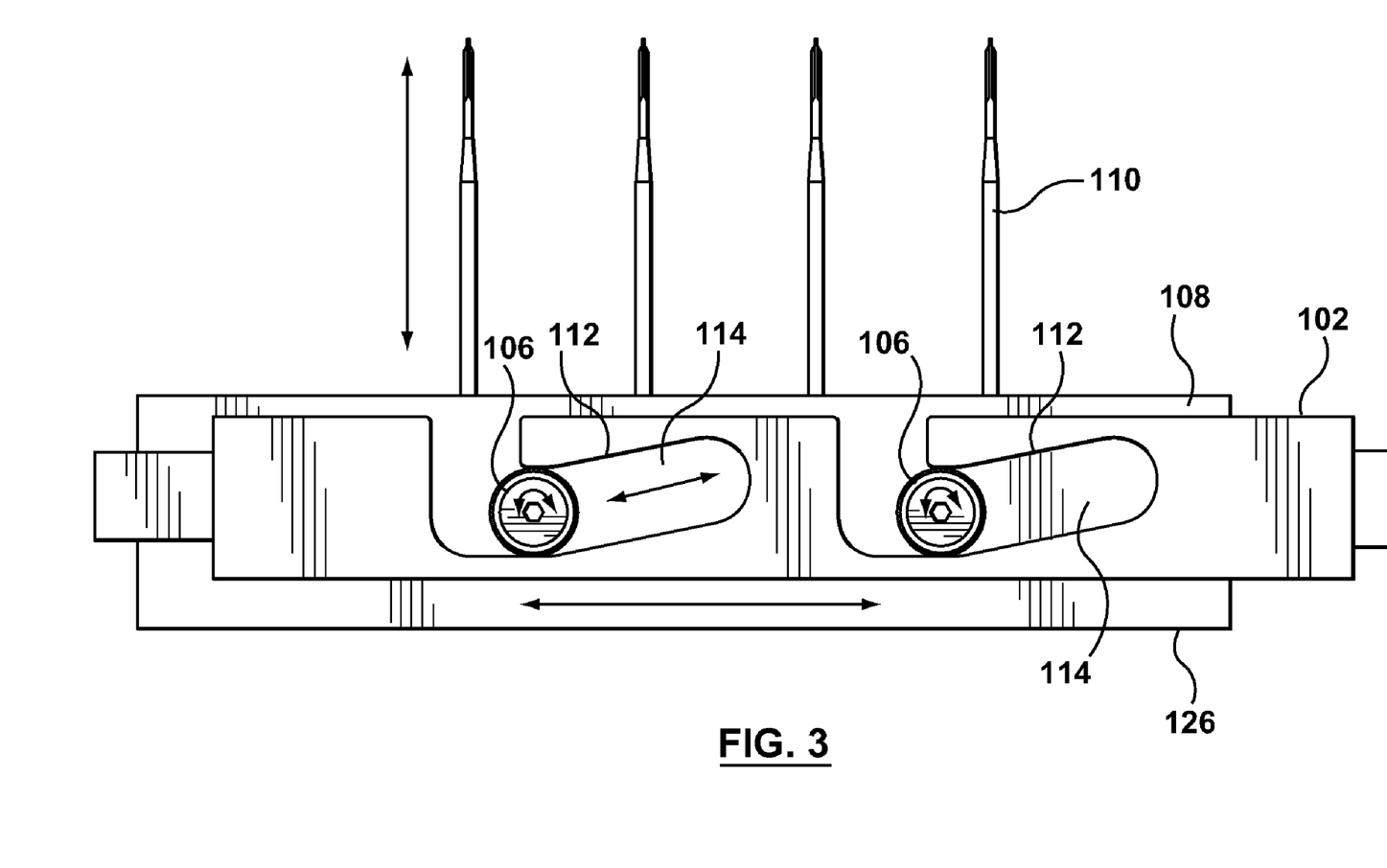
FIG. 3 is a side view of the cam apparatus illustrating the degrees of movement inherent in the system, including the lateral movement of the cam bar causing rotation of the cam followers which follows the profiled cam slots resulting in perpendicular translation of the actuator plate and attached valve stems.

Referring now to FIG. 1 and FIG. 2, an electric motor 156 rotates a ball screw 148 through a coupling 154 which in turn causes axial translation of a yoke 152 via ball screw nut 155, though it may be appreciated that the drive mechanism may also be pneumatic or hydraulic alternatively. Attached to the yoke 152 are a plurality of cam bars 102 which traverse bearing rails 104 via linear bearings 146, each linear bearing 146 attached to the cam bars 102 via a plurality of fasteners 160, such as socket head cap screws, or equivalent, securing a retaining cap 158. Each cam bar 102 has a plurality of cam slots 112 cut therein, each cam slot 112 having a profile 114 generally angled in design, as shown in FIG. 3, though it may be appreciated that the profile 114 of the cam slot 112 need not be limited to a linear contour but may be of any polynomial curve such as a spline or the like.

An actuation plate 108 is fitted with a plurality of guide pins 150 which align the actuation plate 108 perpendicular to the bearing rails 104. Attached to the periphery of the actuation plate 108 are a plurality of cam followers 106, the cam followers being of very low friction, such as rollers or the like, which, in use, reside in the cam slots 112 within the cam bars 102. Linear movement of the cam bars 102, as described above, in turn cause the cam followers 106 to rotate as the profile 114 of the cam slot travels there over, further illustrated in FIG. 3.

Figure 8A:
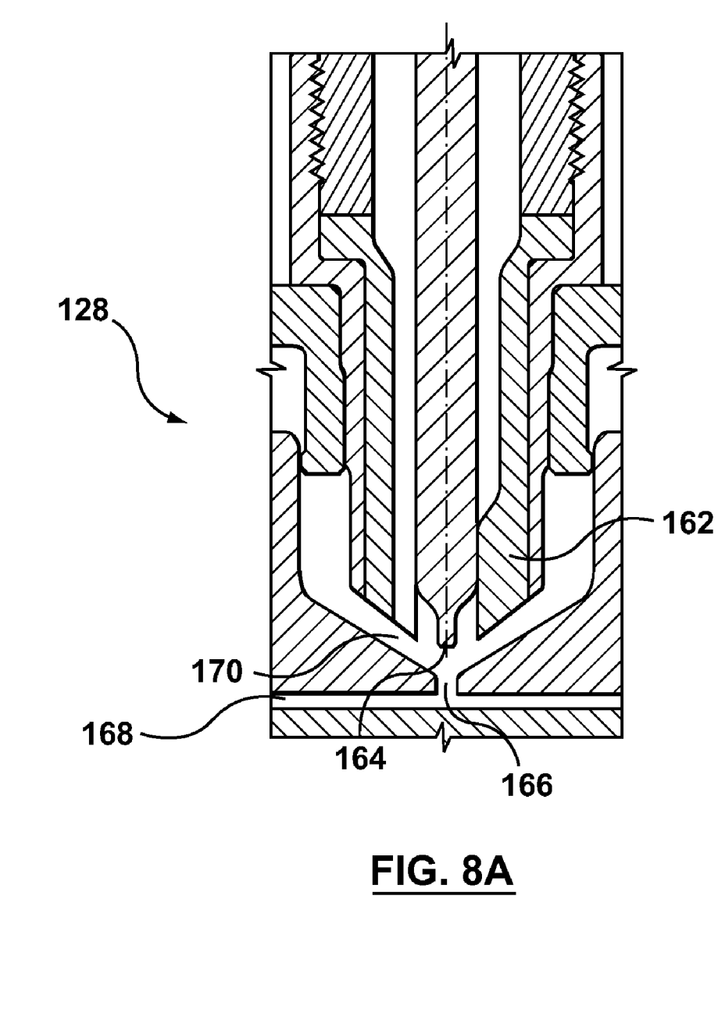
FIGS. 8A and 8B show the valve stem, guided by the nozzle tip, in a gate open and gate closed position, respectively.
Figure 8B:
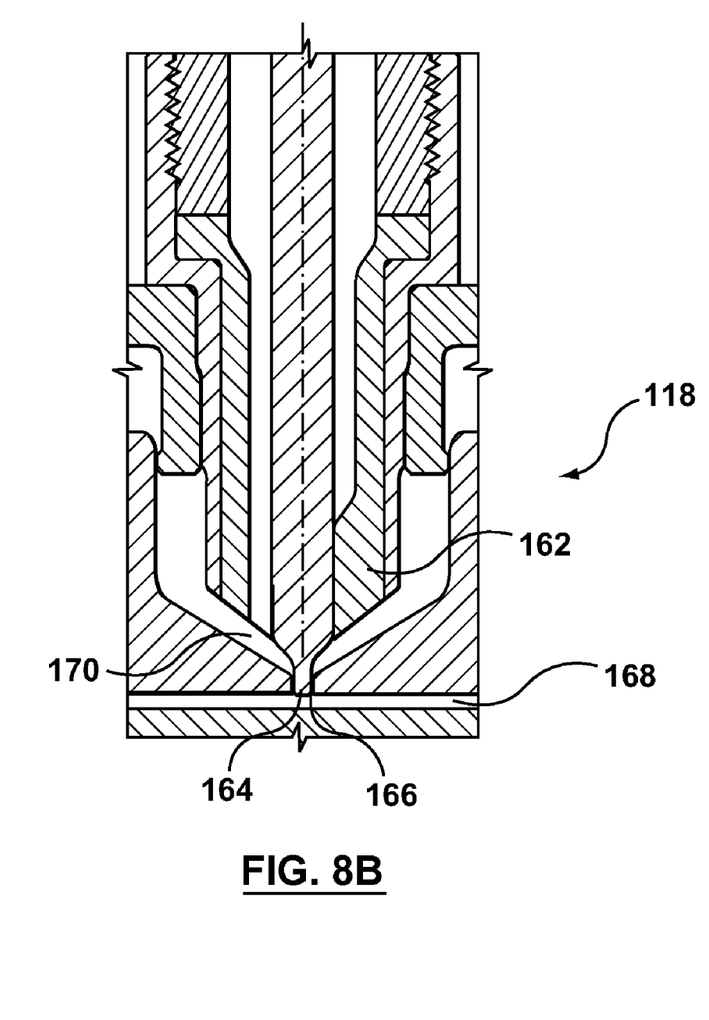

Referring again to FIG. 3 and also FIGS. 8A and 8B, a plurality of valve stems 110 are installed in an actuation plate 108 and are positioned at a pitch spacing as determined by the proximity of gate orifices 166 on the molded articles 168.

As the yoke 152 and cam bars 102 move laterally, the angular contour of the profile 114 of the cam slots 112 causes the cam followers 106, and consequently the actuation plate 108, to translate the valve stems 110, en masse, perpendicularly, causing the valve stems 110 to advance toward or retract from the gate orifices 166.

Figure 4:
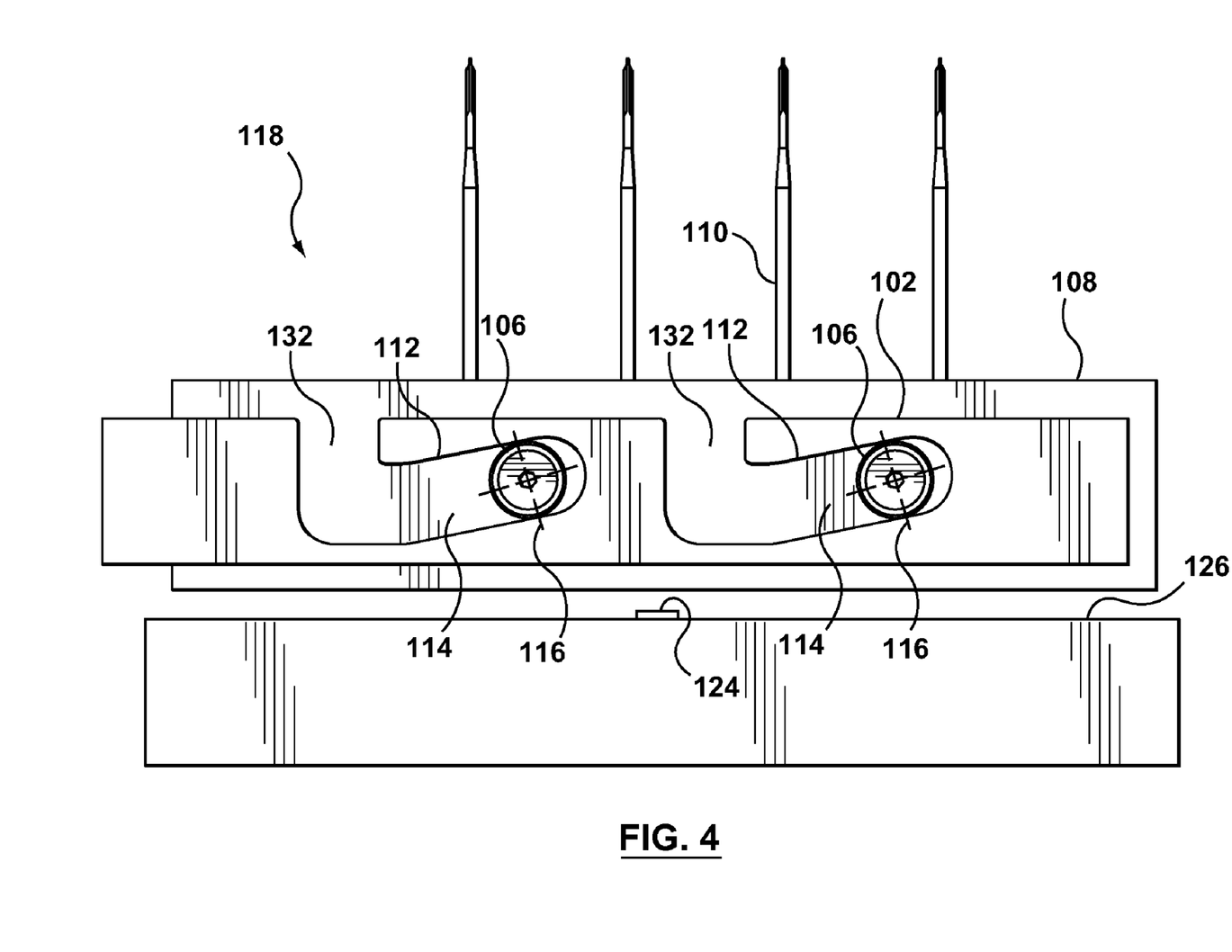
FIG. 4 is a side view of the cam apparatus showing the cam bar with cam followers in the first position resulting in the valve stems being in their forwardmost, or gate closed position.

Turning now to FIG. 4; the cam bar 102 is shown in a position such that the cam followers 106 are engaged near the end of the cam slot 112 at a first position 116 which will yield the valve stems 110, and more importantly, the valve stem tips 164 fully forward in a gate closed position 118 thus precluding the resin flow 170 through nozzle tip 162 from entering gate orifice 166, as shown in detail in FIG. 8B. A plurality of first mechanical stops 120 attached to the actuation plate 108, as shown in FIGS. 1 and 2, limit the travel of the cam followers 106 in the cam slots 112 to the first position 116.

Figure 5:
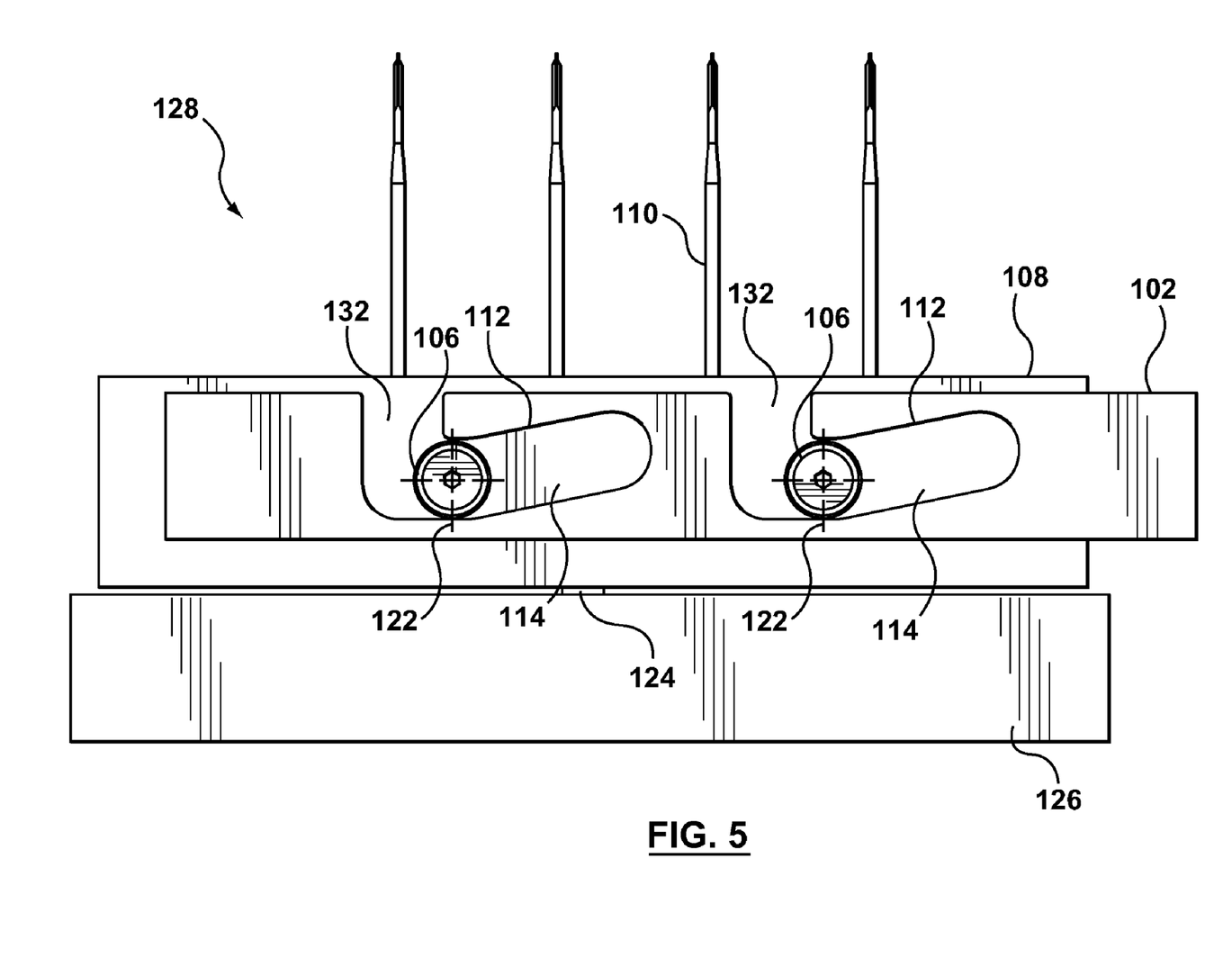
FIG. 5 is a side view of the cam apparatus where the cam followers are residing in the second position in the cam bar thereby moving the stems to a retracted, or gate open position.

FIG. 5 illustrates the cam bar 102 in a second position 122 whereby the cam followers 106 are at the lowest point of the cam slots 112 which renders the valve stems 110, and more particularly, the valve stem tips 164 in a gate open position 128, thus allowing resin flow 170 through nozzle tip 162 and the gate orifice 166 into the molded article 168, as shown in FIG. 8A. A plurality of second mechanical stops 124 installed on either the backing plate 126 or the actuation plate 108 engages the actuation plate 108 to limit the travel of the cam followers 106 in the cam slots 112 to the second position 122. It is also at this second position 122 when the injection pressure required to fill the molded article 168 also acts upon the valve stems 110, and consequently, the actuation plate 108. A plurality of second mechanical stops 124, attached to either the backing plate 126 or the actuation plate 108, prevents the load from being translated to the cam followers 106 by positioning the actuation plate 108 such that the cam followers 106 are not in contact with the profile 114 of the cam slots 112 at their tangencies.

Figure 6:
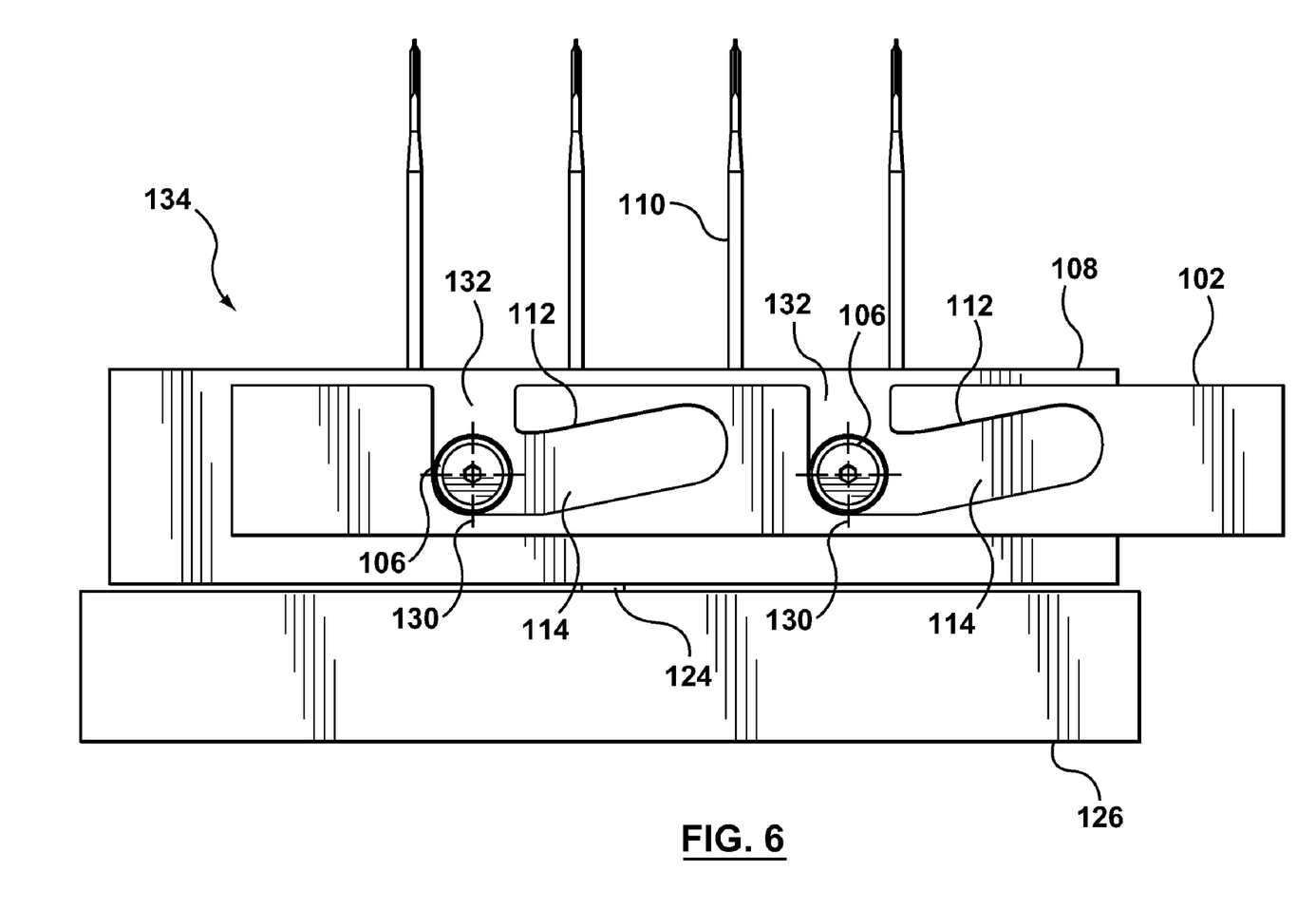
FIG. 6 is a side view of the cam apparatus showing the cam followers in a transitional service position within the cam bar.

Referring now to FIG. 6, cam bar 102 is shown positioned such that the cam followers 106 are disengaged from the cam slots 112 and are poised in a third position 130. As shown in FIGS. 1 and 2, a plurality of third mechanical stops 136 are positioned on the actuation plate 108 serve to locate the exit slots 132 in line with the cam followers 106 such that the actuation plate 108 will remain in a service position 134. It is in this service position 134 whereby a plurality of locking pins 142 are to be installed through the frame assembly 144 and into each cam bar 102 to ensure the accuracy of their position prior to removal of the actuation plate 108 from the cam bars 102.

Figure 7:
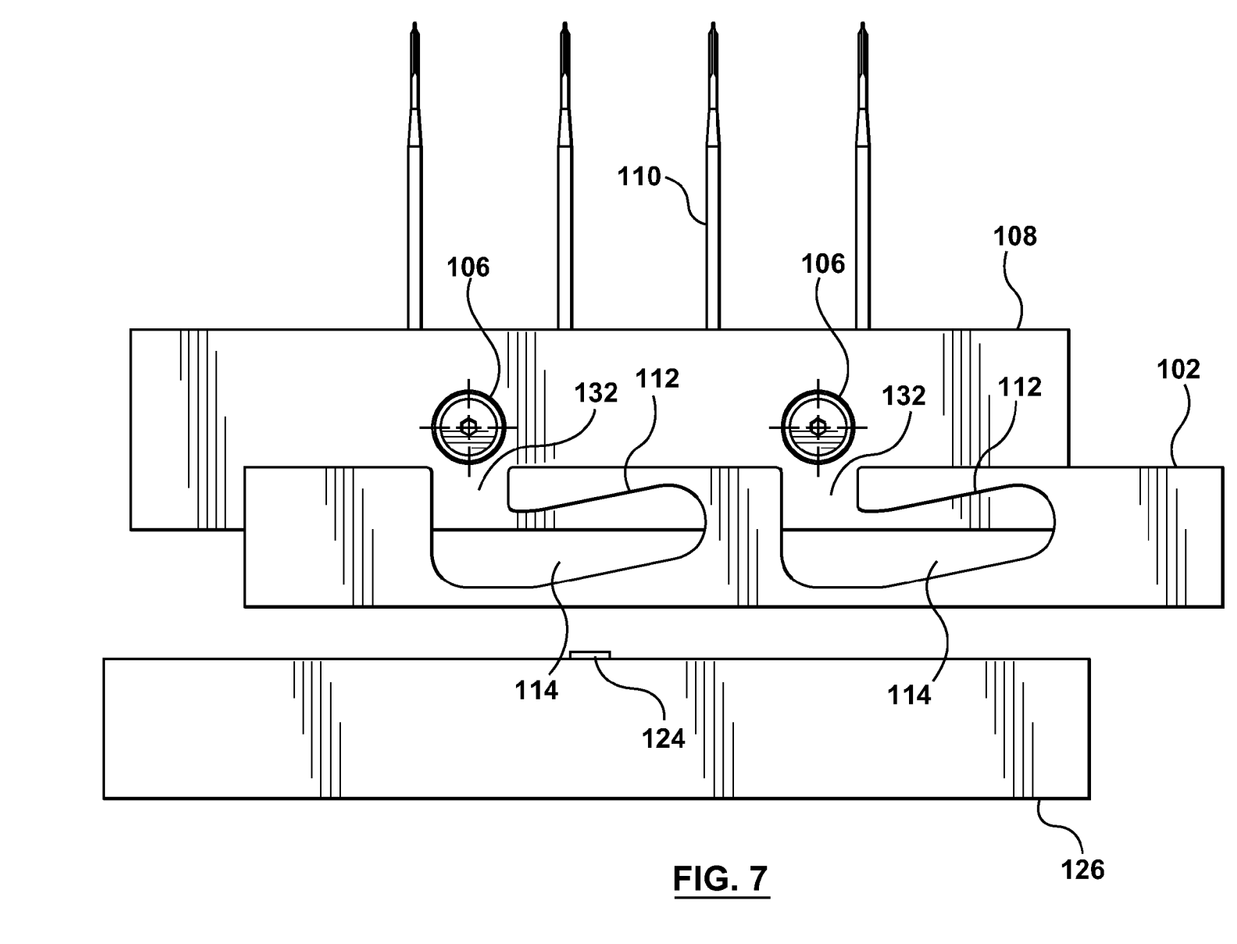
FIG. 7 is a side view of the cam apparatus depicting how the entire actuation plate sub-assembly can be removed from the cam bar openings for maintenance.

FIG. 7 illustrates a subsequent position available to the actuation plate 108 from the abovementioned service position 134, that being its complete removal from the cam bars 102. This feature is made possible by disengaging the cam followers 106 from the exit slots 132 which terminate in a plurality of openings 138 on the clamp face 140 of each cam bar 102 as show in FIG. 2. The actuation plate 108, complete with valve stems 110, can be removed from the entire cam apparatus 100 for ease of maintenance and/or valve stem 110 replacement. Once service work is completed, the reverse procedure is followed by lowering the actuation plate 108 with valve stems 110 therein, back into the exit slots 132 in the cam bars 102. The locking pins 142 serve to ensure that the final position of the actuation plate 108, and hence the valve stems 110, is accurately maintained for future molding.

Figure 9A:
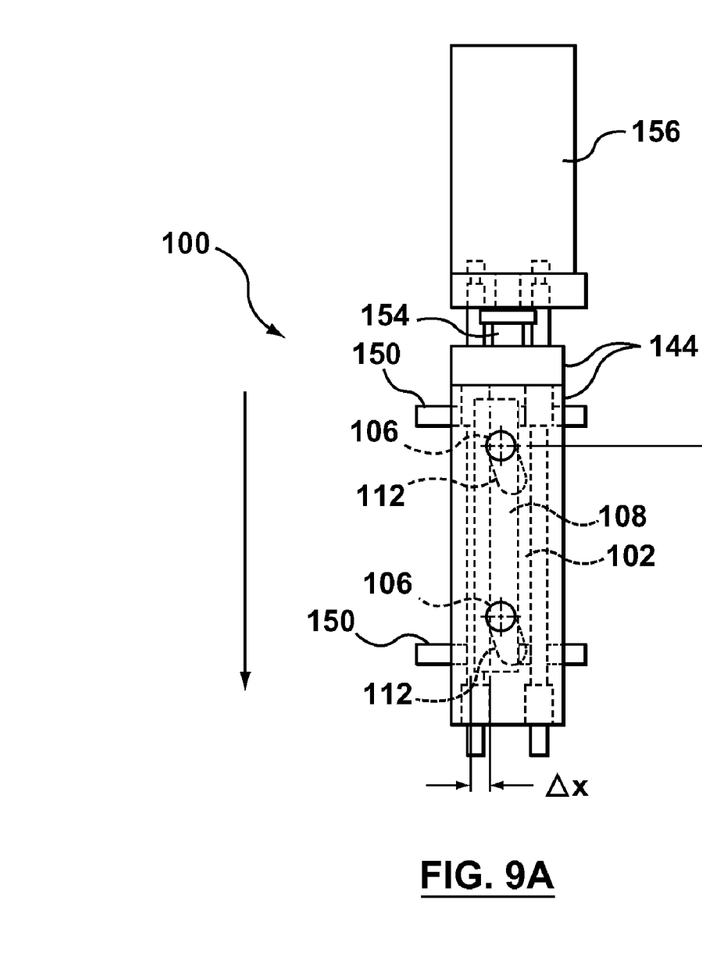
FIGS. 9A and 9B are side views of the cam apparatus illustrating the travel distance of both the cam followers and the cam bars and the resulting perpendicular translation of the valve stem actuation plate.
Figure 9B:
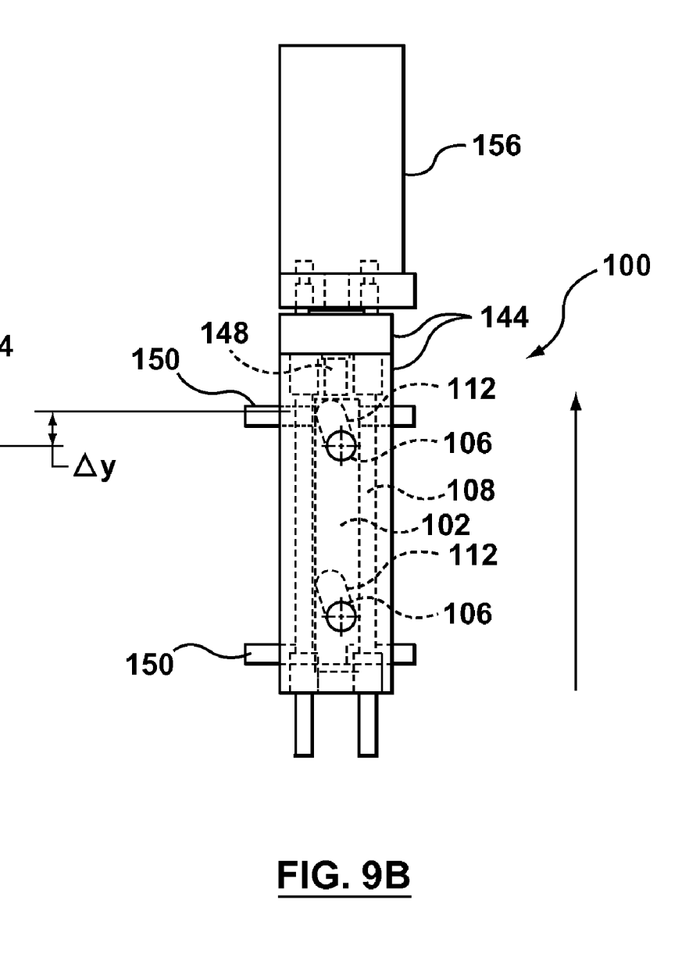

Referring now to FIGS. 9A and 9B, the movement of the cam bars 102, within the cam apparatus 100, is shown to illustrate the total displacement of the cam slots 112 as 'delta y' causing the cam followers 106, attached to the actuation plate 108, to translate said actuation plate 108 perpendicular to the movement of the cam bars 102, a distance of 'delta x'. Actuation plate 108 is limited to relative perpendicular travel via a plurality of guide pins 150. FIG. 9A shows the cam bars 102 as having moved down to their lowest position, while FIG. 9B shows the cam bars 102 in their uppermost position.

Description of the embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention.

Having thus described the embodiments of the present invention, it will be apparent that modifications and enhancements are possible without departing from the concepts as described. Therefore, what is to be protected by way of letters patent are limited by the scope of the following claims.

What is claimed is:

1. A cam apparatus for a valve stem actuator, the cam apparatus comprising:
   a plurality of cam bars, movably mounted on a plurality of bearing rails, the plurality of cam bars having a plurality of profiled cam slots;
   a plurality of cam followers joined to an actuation plate of a hot runner having a plurality of valve stems mounted on the actuation plate, the plurality of valve stems are simultaneously translated through a gate open position, a gate closed positioned, and a service position, via travel of the plurality of cam followers, attached to the actuation plate, in the plurality of profiled cam slots; and
   a locking pin for removal of the actuation plate and the plurality of valve stems for servicing, the locking pin inserted through a frame assembly of the hot runner and into the plurality of cam bars, the locking pin to ensure position of the plurality of valve stems is maintained upon re-installation of the actuation plate, to ensure accuracy of alignment of each valve stem to a respective gate orifice,
   whereby the plurality of cam followers and the actuation plate configured to be removed through a plurality of exit slots from the plurality of cam bars which have openings on their clamp face, so that the actuation plate and the plurality of valve stems is free of the hot runner for ease of maintenance.

2. The cam apparatus according to claim 1, wherein:
the plurality of profiled cam slots have a profile wherein linear movement of the profile of the plurality of profiled cam slots causes the plurality of cam followers to translate the actuation plate to a plurality of perpendicular positions.

3. The cam apparatus according to claim 2, wherein:
the profile of the plurality of profiled cam slots has a first position, wherein when in the first position, the plurality of cam followers of the actuation plate move the plurality of valve stems to a gate closed position.

4. The cam apparatus according to claim 3, wherein:
the profile of the plurality of profiled cam slots has a second position, wherein when in the second position, the plurality of cam followers of the actuation plate move the plurality of valve stems to the gate open position.

5. The cam apparatus according to claim 4, further comprising:
a plurality of mechanical stops, attached to any one of a backing plate and the actuation plate, for limiting movement of the plurality of cam followers in the plurality of profiled cam slots to the second position.

6. The cam apparatus according to claim 1, wherein:
a profile of the plurality of profiled cam slots has a third position, wherein when in the third position, the plurality of cam followers disengage from a second position of the profile and align in the plurality of exit slots in the plurality of cam bars and move the actuation plate to the service position.

7. The cam apparatus according to claim 1, further comprising:
a plurality of mechanical stops, attached to either the actuation plate or a backing plate, for limiting movement of the plurality of cam followers in the plurality of profiled cam slots a first position and a third position.

8. The cam apparatus according to claim 1, wherein:
the plurality of exit slots terminate in a plurality of openings on a plurality of clamp faces on the plurality of cam bars through which the plurality of cam followers may fully disengage the actuation plate from the plurality of cam bars.

9. The cam apparatus according to claim 1, wherein:
the plurality of cam bars are moved to a third position such that the plurality of cam followers are aligned in the plurality of exit slots within the plurality of cam bars.

10. The cam apparatus according to claim 9, wherein:
the locking pin is engaged through the frame assembly and into the plurality of cam bars.

11. The cam apparatus according to claim 10, wherein:
the actuation plate is removed by sliding the plurality of cam followers along the plurality of exit slots in the plurality of cam bars.

12. The cam apparatus according to claim 11, wherein:
the actuation plate is disengaged from the plurality of cam bars via a plurality of openings on clamp faces on the plurality of cam bars through which the plurality of cam followers may exit the plurality of cam bars.

13. The cam apparatus according to claim 12, wherein:
movement of the plurality of cam followers is limited in the plurality of profiled cam slots to the third position via a plurality of mechanical stops, attached to either the actuation plate or a backing plate.

14. The cam apparatus according to claim 1, wherein:
a profile of the plurality of profiled cam slots has a first position at which the plurality of cam followers, attached to the actuation plate, cause the plurality of valve stems to be in a gate closed position.

15. The cam apparatus according to claim 1, wherein:
a profile of the plurality of profiled cam slots has a second position at which the plurality of cam followers, attached to the actuation plate, cause the plurality of valve stems to be in the gate open position.

16. The cam apparatus according to claim 1, wherein:
a profile of the plurality of profiled cam slots has a third position at which the plurality of cam followers, attached to the actuation plate, are disengaged from a second position and poised in an exit slot for imminent removal.

17. The cam apparatus according to claim 1, wherein:
a plurality of mechanical stops are attached to any one of the actuation plate and to a backing plate, to limit an amount of travel by the actuation plate in certain phases of travel to ensure precise location is achieved and to prevent excessive injection force from being transferred to the plurality of cam followers.

18. A hot runner having the cam apparatus of any preceding claim.

19. A molding system including a hot runner having the cam apparatus of any preceding claim.

\* \* \* \* \*